Aug. 11, 1959 M. F. NATHAN 2,899,284
FLUID PLATINUM SYSTEM
Original Filed Feb. 16, 1954
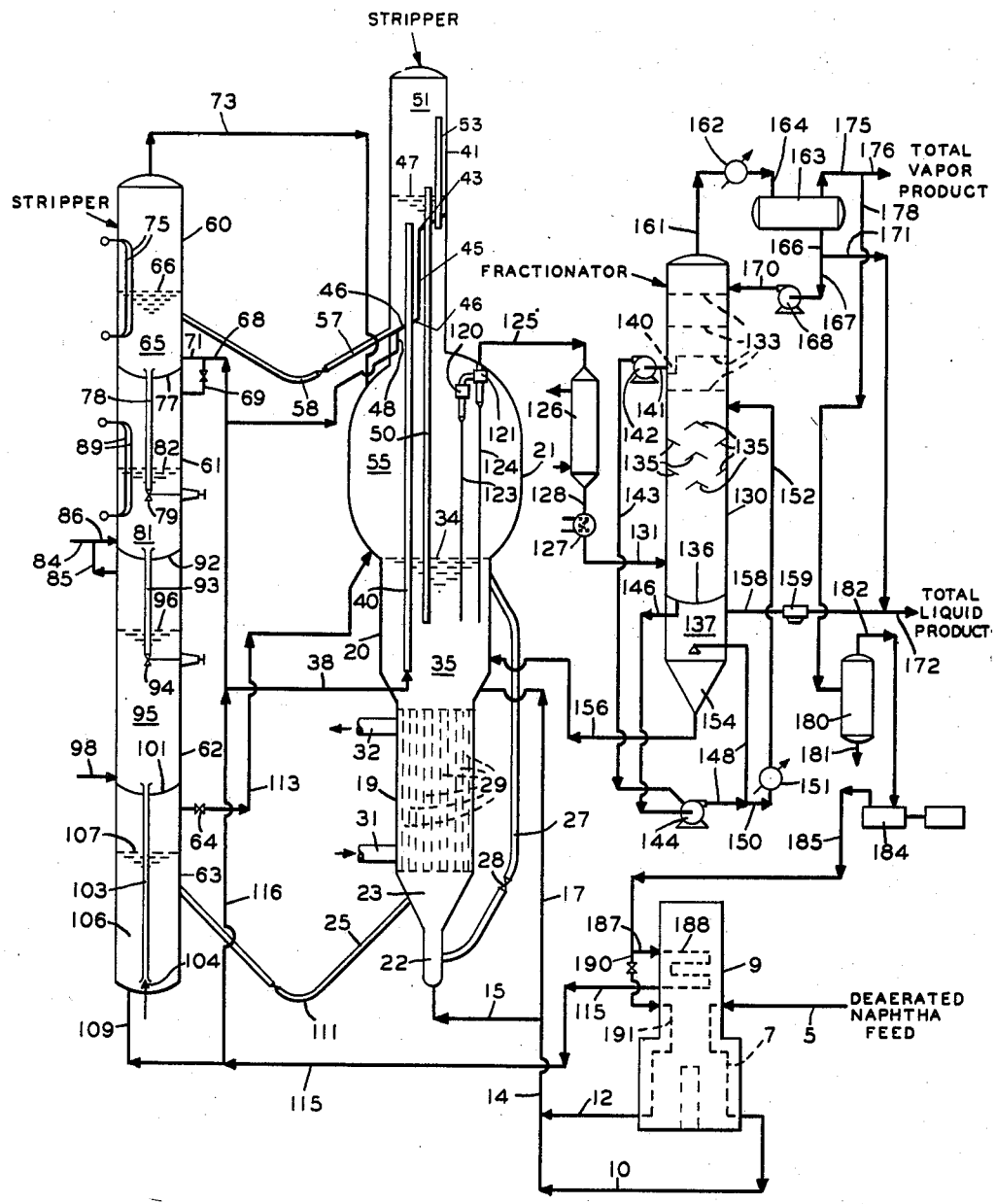
INVENTOR
M. F. NATHAN
BY G. H. PALMER
ATTORNEY
C. D. FARNSWORTH
AGENT United States Patent Office
2,899,284
Patented Aug. 11, 1959

2,899,284

FLUID PLATINUM SYSTEM

Marvin F. Nathan, New York, N.Y., assignor to The M. W. Kellogg Company, Jersey City, N.J., a corporation of Delaware Original application February 16, 1954, Serial No. 410,571, now Patent No. 2,791,542, dated May 7, 1957. Divided and this application July 9, 1956, Serial No. 596,721

8 Claims. (Cl. 23—288)

This invention relates to improved method and means of effecting the conversion of hydrocarbons and, more particularly, it pertains to improved method and means of effecting the conversion of light hydrocarbon oils to normally liquid material of high anti-knock quality by means of a fluidized platinum catalyst. Still more particularly, this invention is concerned with an improved method of stripping spent or contaminated catalyst which is employed in the hydrocarbon conversion zone, and further, it provides an effective method for minimizing catalyst loss due to entrainment in the gaseous effluent streams from the processing zones.

This application is a division of application Serial No. 410,571, filed February 16, 1954, now U.S. Patent 2,791,542.

In the field of hydroforming, the fluid technique has been applied principally to a type of catalyst which is relatively cheap, hence, the operation can tolerate catalyst loss due to entrainment in the gaseous effluent streams. Since platinum catalysts are quite expensive to manufacture, it was not advisable in the past to employ the same in a fluid system by reason that the high catalyst loss makes this practice prohibitive. However, in accordance with the present invention, method and means are provided whereby a platinum catalyst can be employed in a fluid system without incurring substantial or significant loss of catalyst due to entrainment in the gaseous effluent streams of the processing zones.

An object of this invention is to provide improved method and means for effecting the conversion of hydrocarbons by means of fluidized platinum catalyst.

Another object of this invention is to provide improved method and means for reforming light hydrocarbon oils by means of fluidized platinum catalyst without incurring substantial loss of catalyst due to entrainment in the gaseous effluent streams of the processing zones.

Still another object of this invention is to provide an improved method of stripping spent finely divided platinum catalyst which has been employed for the conversion of hydrocarbons, more particularly, to reform light hydrocarbon oils.

Other objects and advantages of this invention will become apparent from the following description and explanation thereof.

It is contemplated by means of the present invention to contact a hydrocarbon reactant with a fluidized mass of finely divided platinum catalyst under suitable conversion conditions in a reaction zone such that a desired reaction product is produced and the catalyst is contaminated with carbonaceous material, withdrawing contaminated catalyst from the reaction zone and passing the same to a first stripping zone wherein it is contacted with a gasiform stripping agent for the removal of volatile material therefrom, passing the stripped catalyst to a second stripping zone wherein it is contacted with a mixture comprising flue gas and hydrogen containing gas for the additional removal of volatile material therefrom, passing the stripped catalyst from the second stripping zone to a first regeneration zone wherein the carbonaceous material on the catalyst is burned with an oxygen containing gas thus producing a flue gas, passing the flue gas from the first regeneration zone to the second stripping zone, passing the regenerated catalyst from the first regeneration zone to a second regeneration zone wherein it is contacted with an oxygen containing gas for rejuvenation treatment, passing the gaseous product material from the second regeneration zone to the first regeneration zone, passing catalyst from the second regeneration zone to a reduction zone wherein the catalyst is treated with a gaseous reducing material, passing the gaseous effluent from the second stripping zone and the reducing zone to the reaction zone, passing catalyst from the reducing zone to the reaction zone, and introducing hydrogen containing gas to the second stripping zone in an amount sufficient to react with all of the oxygen being supplied to the first and second regeneration zones.

The present invention is applicable to a hydrocarbon conversion process in which platinum is useful as a catalytic material. For example, the present invention can be used for reforming, desulfurization, hydrodesulfurization, hydrogenation, dehydrogenation, hydrocracking, isomerization, etc. Among the various uses of the pressent invention, it is especially suited for reforming light hydrocarbon oils. In the case of a hydrocarbon conversion process, a suitable hydrocarbon reactant is contacted at a temperature of about 500° to about 1250° F., a pressure of about 1 atmosphere to about 1500 p.s.i.g., a weight space velocity of about 0.05 to about 15, and a catalyst to oil ratio, on a weight basis, of about .01 to about 12.

The reforming of light hydrocarbon oils can be effected at a temperature of about 750° to about 1150° F., more usually, about 850° to about 975° F. At these temperatures, the total pressure of reaction is maintained at about 50 to about 1000 p.s.i.g., although more usually, the pressure falls within the range of about 100 to about 750 p.s.i.g. The weight space velocity or the quantity of oil processed to the reforming zone, on an hourly basis, relative to the quantity of catalyst present therein is generally about 0.01 to about 10, more usually, about 0.1 to about 5. The quantity of hydrogen which is added to the process is measured in terms of standard cubic feet (70° F. and 760 mm.) per barrel of oil feed (1 barrel equals 42 gallons). In general, the hydrogen feed to the reforming zone can be from about 500 to about 15,000 s.c.f.b., although more usually, it is about 1000 to about 7500 s.c.f.b. The conditions of operation can be selected to provide a reaction involving a net consumption or net production of hydrogen. For the purpose of this invention, it is preferred to operate a reforming reaction to obtain a net production of hydrogen.

The catalyst which is employed for the purpose of this invention comprises platinum. Generally, the platinum catalyst is dispersed on a suitable carrier material such as, for example, alumina, silica-alumina, kieselguhr, pumice, zinc spinel, bauxite, etc. The platinum catalyst can be prepared by any method provided it possesses activity for the reactions intended hereunder. The total catalyst contains about .01 to about 5% by weight of platinum. An excellent catalyst for reforming light hydrocarbon oils is platinum supported on alumina.

In order to provide a better understanding of the present invention, reference will be had to the accompanying drawing which provides part of this specification.

In the drawing, naphtha having an API gravity of 58.2° is supplied from line 5, at the rate of 9000 b.p.s.d., to coil 7 of furnace 9. Naphtha vapors are discharged from furnace 9 by means of line 10 at a temperature of 900° F. and a pressure of 215 p.s.i.g. Recycle gas containing hydrogen is supplied from line 12 at a temperature of 1050° F. and at a rate of 14,443 pounds per hour. The recycle gas has a molecular weight of 7.3. The recycle gas in line 12 combines with naphtha vapors in line 10 and as a combined stream they flow through line 14 such that about 20,000 pounds per hour of the mixture flows to line 15 and the remaining portion, that is, 91,883 pounds per hour, flows through line 17. The mixture of recycle gas and naphtha flows to a reforming reactor which is comprised of a heating section 19, a main reaction section 20 and a disengaging section 21. The reactant stream passing through line 15 enters the bottom of mixing conduit 22. Mixing conduit 22 has superimposed upon it an enlarged section 23, which is in turn, connected to heating section 19. Regenerated platinum catalyst is introduced into enlarged section 23 by means of transfer line 25. Platinum catalyst containing 0.6% by weight of platinum on alumina is withdrawn from the upper part of reaction section 20, and it is circulated downwardly through standpipe 27 which contains valve 28 for the purpose of controlling automatically the flow of catalyst therein, and the bottom end of this standpipe is connected to mixing conduit 22. Fresh or regenerated platinum catalyst, recycle catalyst and the mixture of recycle gas and naphtha flow upwardly through heating section 19. Heating section 19 comprises a bank of tubes represented as tubes 29. A heating medium is supplied to the shell side of heating section 19 by means of inlet line 31 which is connected to the bottom end thereof and this heating medium is discharged therefrom by means of line 32. In this example, the heating medium is flue gas having a temperature of 1900° F. and it is discharged from heating section 19 through line 32 at a temperature of 1200° F. A mercury boiler system can also be employed for the purpose of supplying heat to the reaction zone. In this connection, the mercury is heated to a temperature of about 1000° to about 1200° F. under a pressure of about 100 to about 300 p.s.i.g. Under these conditions, the mercury is in the form of a vapor, and as such, it is supplied to heater section 19 by means of line 32, wherein it is condensed and the heat of condensation is transferred indirectly to the reforming zone.

Since hydroforming with a platinum catalyst is highly endothermic, heat is preferably supplied to the reaction zone by means other than the use of a high catalyst to oil ratio. The combined catalyst streams of regenerated catalyst and recycle catalyst are passed upwardly as a suspension in the reactant material through heating section 19 and the total mass is heated while reforming reactions are taking place. The suspension of catalyst in the reactant material passes from heating section 19 to reaction section 20 wherein a dense fluid bed of platinum catalyst is maintained having a level 34. As the catalyst moves upwardly through dense bed 35, the temperature is lowered by reason of the endothermic reactions, consequently, a portion thereof is withdrawn from the top part of dense bed 35 by means of line 27. For the purpose of this invention, the recycle catalyst flowing through standpipe 27 can be expressed in terms of a weight ratio relative to the quantity of freshly regenerated catalyst which is supplied to the reaction system via transfer line 25. In general, the recycle rate expressed as a weight ratio of used catalyst flowing through standpipe 27 to regenerated catalyst flowing in transfer line 25 is about 10,000 to about 10:1, more usually, about 5000 to about 50:1. Therefore, by means of heating section 19, about 50 to about 150% of the required endothermic heat of reaction is supplied.

The mixture of naphtha and hydrogen containing gas stream is split for passage through lines 15 and 17, because it is desired that a portion of the reactant material, namely, the material flowing in line 15, serves as the carrier gas for recycle and freshly regenerated catalyst. The portion of reactant material flowing in line 17 is introduced directly into the bottom part of catalyst bed 35 in the reaction section 20.

Spent platinum catalyst having a carbon content of about 0.02 to about 1.0% by weight, e.g., 0.2% by weight, is withdrawn from the bottom part of bed 35 by means of recycle gas which is supplied at the rate of 218 pounds per hour through line 38, and the suspension of catalyst in the recycle gas is carried upwardly in a vertical riser 40 which has its upper end terminating in stripping vessel 41. Stripping vessel 41 is superimposed on disengaging zone 21. As in the case of heating section 19, reaction section 20 and disengaging section 21, the stripper 41 is a vertical, cylindrical vessel. Stripping vessel 41 is separated from disengaging zone 21 by means of a partition 43 which slants downwardly to a vertical partition 45 and this vertical partition is in turn connected to another slanting partition 46. A dense, fluidized bed of platinum catalyst is maintained within part of the stripping vessel and it has a level 47. Recycle gas containing hydrogen serves as the gasiform stripping agent in the stripping vessel 41, and it is supplied by means of line 48 which is connected to partition 46 located in the bottom of the stripper. A second vertical riser 50 interconnects disengaging zone 51 of the stripper with the catalyst bed 35 in the reactor. This riser serves to control the level of catalyst in the stripper. In the event that the catalyst in the stripper rises above the upper end of riser 50, catalyst flows downwardly into reactor bed 35. All of the gaseous effluent material in disengaging zone 51 of the stripper is discharged therefrom by means of a third vertical conduit 53. Conduit 53 serves to connect disengaging zone 51 of the stripper with disengaging zone 55 of the reaction system, hence, all of the stripped product passes to disengaging zone 55 of the reaction system and combines with the reaction product. For this invention, stripping is effected at a temperature of 850° F. and recycle gas is supplied to the stripper via line 48 at the rate of 124.2 pounds per hour. Approximately 6000 pounds per hour of spent catalyst are withdrawn from reactor bed 35 and passed to stripper 41. While it is mentioned that recycle gas is used for the purpose of stripping in this illustration, it should be understood that in some instances it may be desirable to employ a different gasiform stripping agent such as, for example, steam, nitrogen, etc. Further, the temperature of stripping in stripper 41 can be varied from about 450° to about 1000° F. In disengaging zone 51, the pressure is maintained at 190.1 p.s.i.g.

Stripped catalyst is withdrawn from stripper 41 by means of transfer line 57 having a bend 58 in the middle portion thereof. The stripped catalyst flows from transfer line 57 to a second stripper 60. The catalyst is then subjected to a series of treatments for the purpose of regeneration. The regeneration system is comprised of a unitary vessel separated into four zones and each zone is superimposed by the other. The second stripper 60 superimposes a first regenerator 61, the first regenator superimposes a second regenerator 62, while the second regenator superimposes a reducer 63. A dense, fluidized bed 65 of platinum catalyst having a level 66 is maintained in second stripper 60. Recycle gas is introduced into the bottom of stripper 60 by means of line 68 at the rate of 41.6 pounds per hour. All of the flue gas generated in regenerator 61 is discharged therefrom by means of line 69, and this flue gas is combined with recycle gas and as a single stream may enter the bottom of stripper 60 by means of line 71. It is significant to note that the quantity of recycle gas which is fed to stripper 60 is regulated on the basis that it will react with substantially all of the oxygen which is supplied to regenerators 61 and 62. The quantity of recycle gas which is fed to stripper 60 is measured to react with all the oxygen on a stoichiometric basis, and thus it provides a safety measure against the danger or risk of any or all the oxygen flowing through the regeneration system without reacting with the carbonaceous material contained on the catalyst. Hence, the flue gas flowing from stripper 60 via line 73 is substantially free of oxygen prior to entering disengaging zone 55 of the reaction system. Further, the flue gas serves to dilute the hydrogen and hydrocarbon material in the recycle gas and, hence, the efficiency of stripping is improved, because the stripping agent in the first stripper 41 is only recycle gas. The second stripper serves an important function in maintaining the total amount of combustible material passing to the first regenerator 61 to a minimum. The combustible material entering the first regenerator 61 is converted to flue gas, and this flue gas will serve to increase the ratio of flue gas to hydrogen evolved by the system, and consequently, it is desirable to strip the spent catalyst as effectively as possible. The quantity of recycle gas introduced into the second stripper 60 is relatively small in comparison with the quantity of flue gas being supplied from the first regenerator. The temperature in stripper 60 is maintained at 700° F. This temperature is selected on the basis that the reaction of recycle gas with all of the oxygen being supplied to the first and second regenerators can only raise the temperature to 1050° F., which is a safe limit for the catalyst without changing the cooling system controls. The increased cooling duty performed by the coils due to the increase in temperature difference between the catalyst bed and the coils compensates for the additional duty resulting from combustion of recycle gas with oxygen. The features described above apply in the case of a cooling involving a vaporizable medium at essentially constant temperature, e.g., water, etc. In the event that reaction conditions are varied such that less coke is produced and so less oxygen is required for regeneration, the temperature of 700° F. can be raised without taking a risk that the catalyst temperature will exceed the upper limit of 1050° F. if all of the oxygen is reacted with the recycle gas. Consequently, the temperature in stripper 60 can be varied from about 600° to about 1100° F. and the upper temperature for the catalyst in this zone while specified as 1050° F., it can be as high as 1150° F.

The temperature of the catalyst in stripper 60 is regulated by means of cooling tubes 75. The pressure in the upper part of stripper 60 is 190.1 p.s.i.g. Stripper 60 is separated from first regenerator 61 by means of a partition 77. Stripped catalyst from stripper 60 is discharged therefrom by means of standpipe 78 which has a slide valve 79 connected to the bottom end thereof. The stripped catalyst flows downwardly through standpipe 78 and forms a dense bed 81 having a level 82 in the first regenerator 61. Air is normally introduced into the bottom part of regenerator 61 by means of line 84 only during start-up. Air and the small amount of products of combustion produced in regenerator 62 is discharged therefrom by means of line 85, hence, the air in line 85 enters the bottom of regenerator 61 by means of line 86. In regenerator 61, the temperature is maintained at about 1050° F. and at a pressure of 195.8 p.s.i.g. Under the conditions existing therein substantially all of the carbonaceous content of the catalyst is removed by burning. The temperature of regeneration in vessel 61 is regulated by means of vertical cooling tubes 89. The temperature of regeneration can be varied over a wide range, namely, from about 600° to about 1100° F. However, it is preferred to maintain the temperature not higher than about 1050° F. in order to avoid substantially deactivating the catalyst at higher temperatures.

It has been found that the properties of a freshly regenerated catalyst which has been treated under relatively mild regeneration conditions can be improved significantly by a severe or drastic treatment involving the proper selection of temperature, oxygen partial pressure and time. For the purpose of this specification and the appended claims, the severe or drastic treatment is known as rejuvenation. The rejuvenation treatment of a platinum catalyst effects improvements in its activity or selectivity. The action of this treatment is not completely understood, however, it is known that unusually good results are obtained thereby. In general, the rejuvenation treatment involves a temperature of about 700° to about 1200° F., more usually, about 750° to about 1000° F. The catalyst is treated at these temperatures with an oxygen containing gas having an oxygen partial pressure under the conditions of treatment of about 3.5 to about 400 p.s.i.a., more usually, about 5 to about 200 p.s.i.a., and preferably, about 14.7 to about 100 p.s.i.a. The time of treatment varies considerably, because when using a high oxygen partial pressure, the period of treatment can be relatively short and the use of a high temperature may only require a short period of treatment. Conversely, a low temperature and an oxygen containing gas having a low oxygen partial pressure require relatively longer periods of treatment. In general, the period of treatment varies from about 15 minutes to about 100 hours, more usually, about 0.5 to about 30 hours. Regenerator 61 is separated from the second regenerator 62 by means of a partition 92. The regenerated catalyst is withdrawn from regenerator 61 by means of a standpipe 93 which has a slide valve 94 at the end thereof for the purpose of controlling the rate of withdrawal. The regenerated catalyst entering regenerator 62 forms a dense, fluidized bed 95 which has a level 96. The temperature of the catalyst bed 95 is 965° F. and it is at a pressure of 200 p.s.i.g. Air is supplied to the bottom of regenerator 62 by means of a line 98 at the rate of 520 pounds per hour. The remainder of the combustion air enters by means of instrument bleed lines (not shown).

As a result of the rejuvenation treatment, the platinum catalyst contains adsorbed oxygen and at least, in part, the platinum has reacted with the oxygen. The rejuvenated catalyst can be returned directly to the reaction zone by reason of the reducing atmosphere therein. However, by passing rejuvenation catalyst directly to the reaction zone there may be a loss of hydrocarbon material by virtue of the reduction reaction with the catalyst. To avoid this adverse effect, the rejuvenated catalyst is treated with gasiform reducing agent, for example, recycle gas containing hydrogen and normally gaseous hydrocarbons. The reduction treatment can be conducted at a temperature of about 500° to about 1100° F. and for a period of about 5 minutes to 10 hours, more usually, about 15 minutes to about 2 hours. In the drawing, regenerator 62 is separated from reducer 63 by means of a partition 101. The rejuvenated catalyst is withdrawn from regenerator 62 by means of standpipe 103 which contains a plug valve 104 in the bottom end thereof for the purpose of controlling the rate of catalyst withdrawal. The catalyst entering reducer 63 forms a dense fluidized bed 106 having a level 107. The temperature in the reducer is maintained at 930° F. and at a pressure of 204 p.s.i.g. Recycle gas is introduced into the bottom end of the reducer by means of line 109 at the rate of 288.6 pounds per hour. The reduced catalyst is withdrawn from the reducer by means of transfer line 25 having a bend 111 in the middle portion thereof. The gaseous reaction product is discharged from reducer 63 by means of line 113 which contains valve 64 for controlling pressure therein, and this line is connected to disengaging section 21 of the reaction system. The recycle gas which is used for stripping in stripper 41, stripper 60 and reducer 63 is supplied from line 115. The recycle gas used for stripping in strippers 41 and 60 is divided from line 15 at line 116 and this line is, in turn, connected to lines 48 and 68.

As previously noted, the gaseous reaction product from reducer 63 and the flue gas from stripper 60 are passed to the disengaging zone 55 of the reaction system. By this method, catalyst fines entrained in these effluent streams can be recovered along with the entrained catalyst fines in the reaction product in a single scrubbing operation to be described in more detail hereunder. The total gaseous material in disengaging zone 55 contains entrained catalyst which is separated therefrom to a substantial extent by means of cyclones 120 and 121 which are connected in series. The separated catalyst is returned to the catalyst bed 35 by means of diplegs 123 and 124. The gaseous reaction product is discharged from cyclone 121 at the rate of 115,354 pounds per hour, and it has a molecular weight of 26.3. The gaseous reaction product has a temperature of 930° F. prior to entering an indirect heat exchanger 126 wherein the temperature is reduced to 648° F. The cooled reaction product passes from exchanger 126 to a second exchanger 127 by means of line 128. As a result of passing through exchanger 127, the temperature of the reaction product is reduced to 420° F. and thence, it passes from the exchanger to a combination fractionator-scrubbing tower 130 by means of line 131. In the upper part of tower 130, there is situated fractionating plates 133; whereas in the middle portion of the tower there are provided baffles 135 for the purpose of scrubbing catalyst fines from the ascending gaseous material. In the bottom part of tower 130, there is a partition which forms section 135 in the bottom of the tower. The temperature at the top of the tower is 350° F. and the pressure is 175 p.s.i.g. On the other hand, the temperature in the bottom part of the scrubbing section is 375° F. and the pressure is 180 p.s.i.g. The liquid which collects in well 140 located in the fractionation section of the tower 130 is withdrawn by means of line 141 and pump 142 at the rate of 5840 pounds per hour. The withdrawn liquid is transported by means of line 143 to the gland (not shown) of pump 144. Liquid is withdrawn from section 130 above partition 136 by means of line 146, and it is pumped by means of pump 144 to provide that 4500 pounds per hour are transferred to settling zone 137 by means of line 148. The other portion is transported from line 148 through line 150, cooler 151 and line 152 at the rate of 101,000 pounds per hour, and thence it enters the upper part of the scrubbing section 130. The temperature of the liquid flowing through cooler 151 is reduced from 375° F. to 345° F. In settling zone 137, the fines in the liquid settle to the bottom of conical section 154, thus forming a supernatant liquid in the upper part thereof. The slurry of catalyst fines is withdrawn from the bottom of conical section 154 by means of line 156, and it is recycled to reaction section 20. The supernatant liquid in settling section 137 is withdrawn therefrom via line 158 which contains a filter 159. This liquid is a polymer having an API gravity of 32°, and it is withdrawn at the rate of 300 b.p.s.d. A vaporous overhead material is withdrawn from the top of tower 130 through line 161 at the rate of 134,957 pounds per hour. This overhead vaporous material is cooled in condenser 162, and thence, it is passed to an accumulator 163 by means of line 164. The temperature of the product material in accumulator 163 is 110° F. and it has a pressure of 170 p.s.i.g. The liquid product material in accumulator 163 is withdrawn therefrom by means of bottom line 166, and 24,113 pounds per hour of this material are passed through line 167. By means of pump 168, this liquid is recycled to the top of tower 130 through line 170. The remaining portion of the liquid in line 166 is passed through another line 171 at the rate of 85,237 pounds per hour. The liquid in line 171 is combined with the polymer in line 158 and the combined stream representing the total liquid product is passed to a product recovery system (not shown) by means of line 172. The gaseous product material in accumulator 163 is withdrawn from the top thereof by means of line 175. A portion of this stream, i.e., 9246 pounds per hour, is yielded through line 176 as a product of the process. Another portion of this gaseous product material is diverted from line 175 to another line 178 at the rate of 16,566 pounds per hour. This stream serves as recycle gas, and, as previously indicated, it has a molecular weight of 7.3. The recycle gas enters a liquid trap 180 in which liquid is collected and discharged from the bottom end thereof by means of line 181. The gaseous material is discharged from trap drum 180 via an overhead line 182, and thence, it is passed to a compressor 184. The compressed recycle gas is discharged from the compressor 184 by means of line 185. This recycle gas has a temperature of 190° F. and a pressure of 245 p.s.i.g. A portion of the recycle gas passes through line 187 and thence, enters coil 188 of furnace 9 wherein the recycle gas is heated to a temperature of 700° F. The heated recycle gas is discharged from coil 188 by means of line 115. The other portion of compressed recycle gas is passed from line 185 to valved line 190 which is connected to coil 191 in furnace 9. This heated recycle gas is discharged from furnace coil 191 at the rate of 14,441 pounds per hour at a temperature of 1050° F. via line 12.

Having thus provided a description of this invention along with specific examples thereof, it should be understood that no undue limitations or restrictions are to be imposed by reason thereof, but that the scope of this invention is defined by the appended claims.

I claim:

1. A unitary vessel for effecting a chemical reaction in the presence of finely divided fluidized contact material comprising in combination a first fluidized material contact zone in the bottom of said vessel, a plurality of adjacently positioned elongated substantially vertical passageways disposed in the lower portion of said vessel above said first contact zone, said passageways surrounded by a heat exchange medium, an enlarged reaction zone positioned above and in open communication with said plurality of passageways, said enlarged reaction zone of sufficient size to maintain a dense fluidized bed of contact material in the lower portion thereof in communication with the top of said passageways and a dilute phase of contact material in the upper portion of said enlarged reaction zone, a stripping chamber positioned above said reaction zone, a first conduit means extending from the lower portion of said reaction zone into said stripping zone, a second conduit means extending from the upper portion of said stripping chamber to the lower portion of said reaction zone, a third conduit in open communication with the upper portion of said stripping chamber and said reaction zone, a fourth conduit means connecting the upper portion of said dense fluidized bed in said reaction zone with said first contact zone, means for introducing reactants to said first contact zone, means for introducing finely divided contact material to said first contact zone, means for passing reactants in a dilute suspension of contact material from said contact zone upwardly through said elongated passageways into said dense fluidized bed, means for removing products of reaction from the upper portion of said reaction zone, means for introducing stripping gas to the lower portion of said stripping zone and means for returning stripped contact material from said stripping zone to said first contact zone.

2. A unitary vessel for effecting a chemical reaction in the presence of finely divided contact material which comprises, a plurality of elongated adjacently positioned contact zones in the lower portion of said vessel, a dense fluidized phase solid contact material reaction zone positioned above said plurality of elongated contact zones and in open communication therewith, a stripping zone positioned above said reaction zone, the upper portion of said stripping zone being in open communication with the upper portion of said reaction zone, a first substantially vertical conduit extending from the lower portion of said dense fluidized phase in said reaction zone into said stripping zone, a second substantially vertical conduit extending from the upper portion of said dense fluidized phase in said reaction zone to the upper portion of said stripping zone, a third conduit connecting the upper portion of said dense fluidized phase in said reaction zone with the bottom of said plurality of elongated contact zones, means for passing a heat exchange medium in indirect heat exchange with said plurality of elongated contact zones, means for withdrawing said heat exchange medium, means for withdrawing contact material from said stripping zone, means for introducing stripping gas to the lower portion of said stripping zone, means for introducing solid contact material to the bottom of said plurality of elongated contact zones and means for introducing reactant to said plurality of contact zones.

3. A vessel for effecting a chemical reaction in the presence of finely divided solid contact material comprising in combination a mixing zone in the lower portion of said vessel, a plurality of adjacently positioned substantially vertical elongated reaction zones positioned above said mixing zone, said plurality of elongated reaction zones in indirect heat exchange with a heat excange medium, a reaction zone positioned about said plurality of substantially vertical reaction zones of sufficient size to maintain a dense fluidized bed of contact material therein, a settling zone positioned above and of larger cross-sectional area than said dense fluidized bed reaction zone, a stripping zone of smaller cross-sectional area than said dense fluidized bed reaction zone positioned above said settling zone and separated therefrom by baffle means, the upper portion of said stripping zone being in open communication with the upper portion of said settling zone, a first conduit extending from the lower portion of said dense fluidized bed into said stripping zone, a second conduit connecting the upper portion of said dense fluidized bed with the upper portion of said stripping zone, a fourth conduit connecting said dense fluidized bed with said mixing zone, means for introducing stripping gas to said stripping zone, means for withdrawing stripped contact material from said stripping zone, means for regenerating contact material withdrawn from said stripping zone, means for passing regenerated contact material to said mixing zone, means for introducing a reactant to said mixing zone and means for withdrawing reaction products and stripping gas from the upper portion of said settling zone.

4. A reaction vessel for effecting a chemical reaction in the presence of finely divided solid contact material which comprises in combination a reactant-solid contact material mixing chamber in the lower portion of said vessel, a plurality of elongated substantially vertical reaction conduits positioned above said mixing chamber, said plurality of elongated reaction conduits in indirect heat exchange with a heat exchange medium, a reaction chamber positioned above said plurality of elongated reaction conduits and in open communication therewith, said reaction chamber of larger diameter than said mixing chamber and of sufficient size to maintain a dense fluidized bed of contact material therein above said plurality of elongated reaction conduits, means for passing reactant from said mixing chamber in a dilute suspension of contact material upwardly through said plurality of elongated reaction conduits into said dense fluidized bed, a stripping chamber positioned above said reaction chamber and separated therefrom by a baffle means, a conduit connecting the lower portion of said dense fluidized bed with said stripping chamber, a second conduit connecting the upper portion of said dense fluidized bed with the upper portion of said stripping chamber, a third conduit connecting the upper portion of said dense fluidized bed with said mixing chamber, means for introducing reactant and finely divided contact material to said mixing chamber, means for introducing stripping gas to said stripping chamber, means for withdrawing stripped contact material from said stripping chamber and means for withdrawing products of reaction and stripping gas from said vessel.

5. A unitary vessel comprising in combination a mixing chamber, a reaction chamber of larger diameter than said mixing chamber, a stripping chamber of smaller diameter than said reaction chamber, a plurality of adjacently positioned elongated conduits connecting the upper portion of said mixing chamber with the lower portion of said reaction chamber, said elongated conduits surrounded by a heat exchange medium, a first conduit external of said vessel directly connecting said reaction chamber with said mixing chamber, a second conduit internal of said vessel connecting the upper portion of said reaction chamber with the upper portion of said stripping chamber and means for passing a gaseous suspension of finely divided contact material upwardly through said vessel from said mixing chamber to said stripping chamber.

6. An apparatus comprising in combination a first vessel, means for passage of a gaseous suspension of finely divided solid material upwardly through said vessel and through an indirect heat exchanger chamber with a reaction chamber of large cross-sectional area superimposed above said heat exchange chamber and in which a dense fluidized bed of contact material is maintained, a first stripping chamber of reduced cross-sectional area relative to said reaction chamber positioned in the upper portion of said first vessel and above said reaction chamber, a second substantially vertical cylindrical vessel positioned adjacent to said reaction chamber comprising an upper stripping chamber, a first regeneration chamber, a second regeneration chamber and a bottom reducing chamber, said first regeneration chamber positioned above said second regeneration chamber, a first transfer conduit for the passage of finely divided solid material from the first stripping chamber to said upper stripping chamber, a second transfer conduit for the transfer of finely divided solid material from the upper stripping chamber to the first regeneration chamber, a third transfer conduit for the transfer of finely divided solid material from the first regeneration chamber to the second regeneration chamber, a fourth transfer conduit for the transfer of finely divided solid material from the second regeneration chamber to the reducing chamber, and a fifth transfer conduit for the transfer of finely divided solid material from the reducing chamber to said indirect heat exchange chamber and means for passing a gaseous material upwardly and sequentially through at least two of said chambers in said second vessel.

7. An unitary vessel comprising in combination a mixing chamber positioned in the lower portion of said vessel, a reaction chamber positioned in the intermediate portion of said vessel, a plurality of open end elongated conduits connecting the upper portion of said mixing chamber with the lower portion of said reaction chamber, said reaction chamber being of larger dimensions than said mixing chamber and of sufficient size to maintain a dense fluidized bed of finely divided solid contact material therein, an elongated substantially vertical stripping chamber superimposed above said reaction chamber and of smaller diameter than said reaction chamber, conduit means for passing a reactant to said mixing chamber, conduit means for passing finely divided solid contact material to said mixing chamber, means for passing reactant in a dilute suspension of finely divided contact material from said mixing chamber upwardly through said plurality of elongated conduits in indirect heat exchange with a heat exchange medium into said dense fluidized bed in said reaction chamber, conduit means for withdrawing products of reaction from the upper portion of said reaction chamber, means for maintaining a dense fluidized bed of contact material in the lower portion of said stripping chamber, means for stripping contact material in said stripping chamber, a first conduit connecting the dense fluidized bed of contact material in said reaction chamber and said stripping chamber, a second conduit connecting the dense fluidized bed in said reaction chamber with the upper portion of said stripping chamber above the dense fluidized bed therein, a third conduit connecting the upper portion of said reaction chamber with the upper portion of said stripping chamber, a fourth conduit connecting the mixing chamber with the upper portion of said dense fluidized bed in said reaction chamber and conduit means for withdrawing stripped contact material from said stripping chamber.

8. An apparatus comprising in combination a first elongated substantially vertical vessel, said first vessel containing a lower mixing chamber, an indirect heat exchange chamber positioned above said mixing chamber, a reaction chamber positioned above said indirect heat exchange chamber, a stripping chamber positioned above said reaction chamber and means for passing finely divided contact material from said mixing chamber upwardly through said indirect heat exchange chamber and said reaction chamber into said stripping chamber, a second elongated substantially vertical vessel positioned adjacent to said first vessel, said second vessel divided into a plurality of superimposed contact chambers, means for maintaining a dense fluidized bed of contact material in each of said contact chambers, means for passing contact material downwardly and sequentially through each of said chambers in said second vessel, means for passing a gaseous material upwardly and sequentially through at least two of said plurality of contact chambers, means for passing a gaseous material from the upper portion of at least one of said contact chambers to the upper portion of said reaction chamber, means for passing finely divided contact material from said stripping chamber to the upper portion of said second vessel and means for passing contact material from the lower portion of said second vessel to said mixing chamber.

References Cited in the file of this patent
UNITED STATES PATENTS

| | | |
|---|---|---|
| 2,394,680 | Gerhold | Feb. 12, 1946 |
| 2,447,116 | Collins | Aug. 17, 1948 |
| 2,761,820 | Snuggs | Sept. 4, 1956 |
| 2,776,248 | Hengstebech | Jan. 1, 1957 |